Oct. 27, 1942.                P. J. KENNON                2,299,905
                        INTERNAL COMBUSTION ENGINE
                          Filed March 26, 1941            4 Sheets-Sheet 1
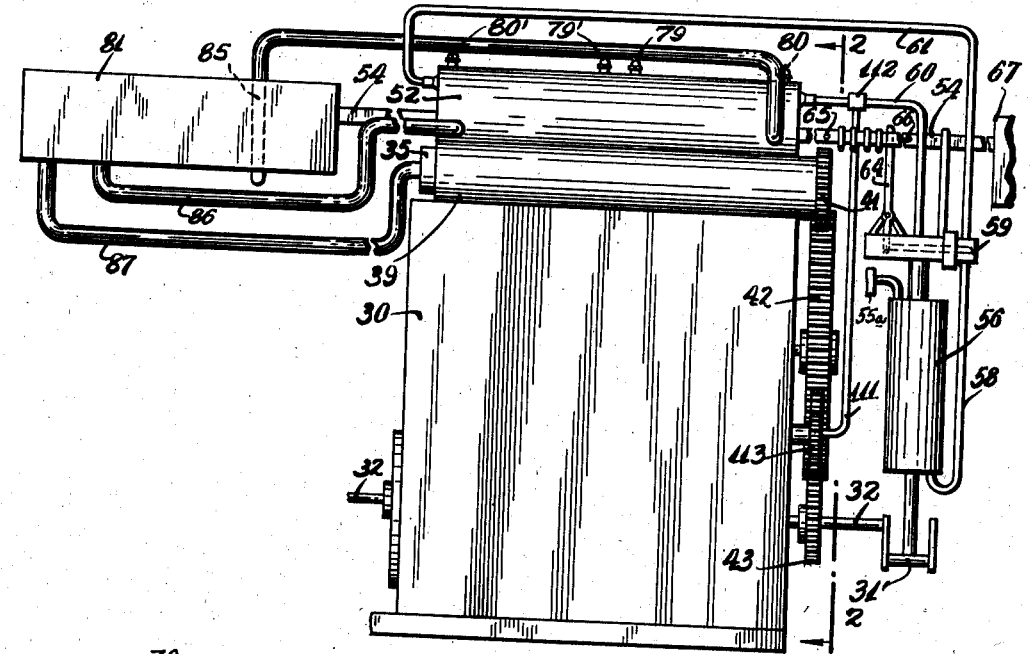
Fig. 1.
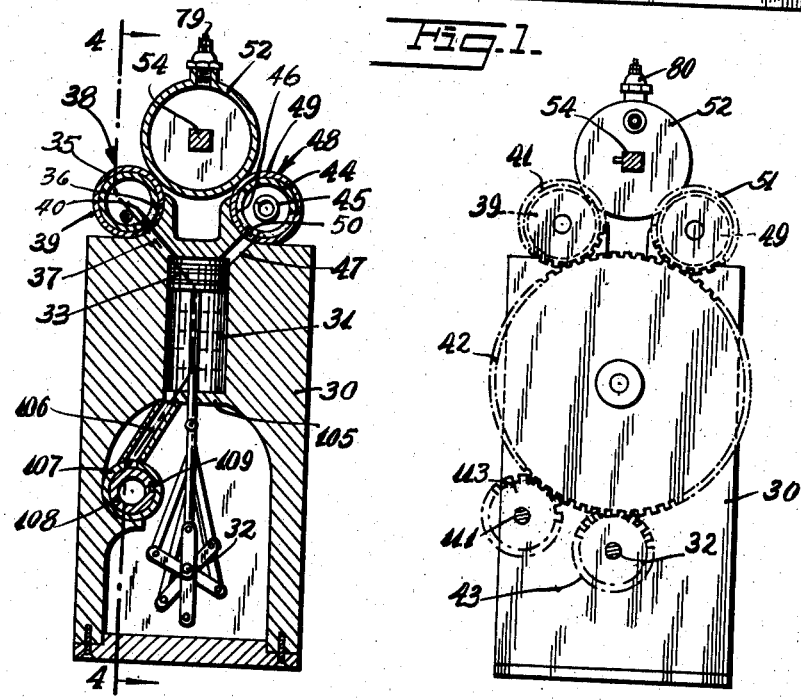
Fig. 3.                          Fig. 2.
INVENTOR
Patrick James Kennon
BY
ATTORNEY INVENTOR
Patrick James Kennon
BY
ATTORNEY

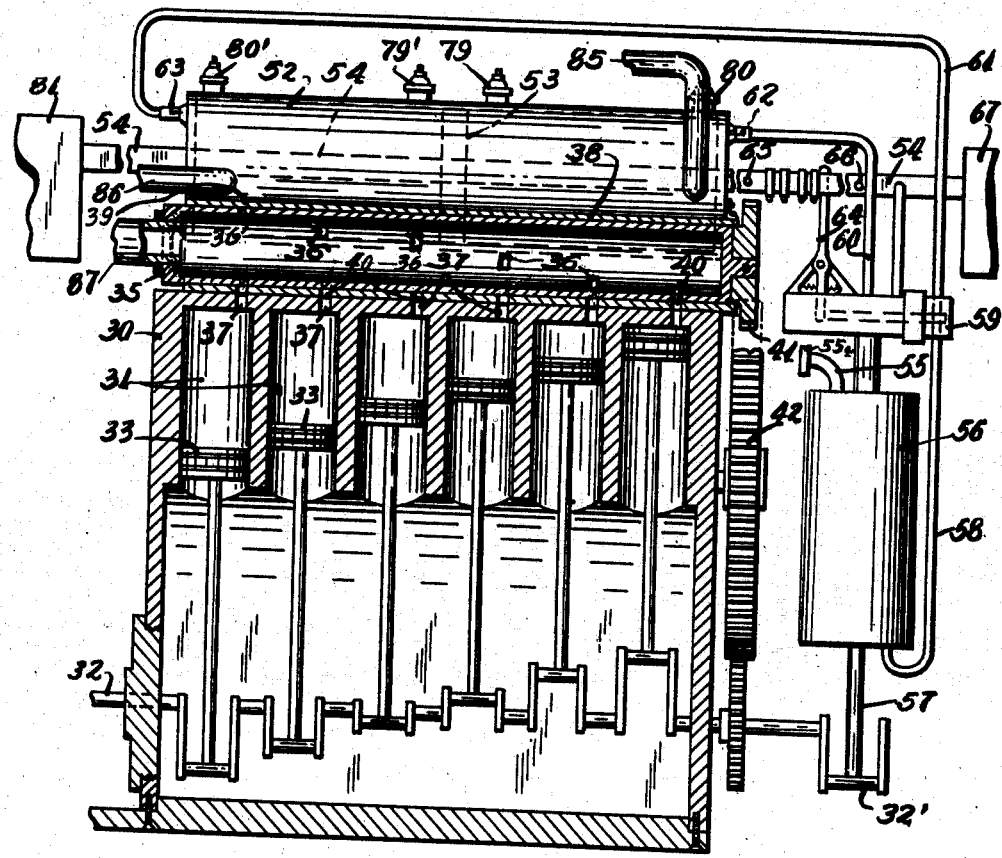

Oct. 27, 1942.  P. J. KENNON  2,299,905
INTERNAL COMBUSTION ENGINE
Filed March 26, 1941        4 Sheets-Sheet 4

INVENTOR
Patrick James Kennon
BY
ATTORNEY

Patented Oct. 27, 1942

2,299,905

UNITED STATES PATENT OFFICE 2,299,905

INTERNAL COMBUSTION ENGINE

Patrick James Kennon, Bronx, N. Y.

Application March 26, 1941, Serial No. 385,266

12 Claims. (Cl. 60—15)

This invention relates to new and useful improvements in engines.

The invention particularly proposes an engine which is characterized by a plurality of cylinders and an arrangement whereby gases under pressure are fed to the cylinder to operate the engine. This construction is an immense improvement over engines in which explosions takes place in the cylinders. Engines of this latter type damage the cylinders after a while and then leakage occurs past the pistons of the cylinders. The invention proposes to so construct and arrange the improved features of the engine that they may be applied to various types and kinds of engines. One of the applications would be to radial reciprocating engines in which there are three or more cylinders, such as airplane engines, another to engines in which the cylinders are arranged in a straight line, or V-shaped, such as automobile engines.

The invention further proposes a combustion chamber having a piston with a rod which projects through the chamber at each side. One end operates a slide valve, the other end operates both the ignition and the feed valve, and a pump which charges each side of the combustion chamber alternately with fuel mixture when the pump pressure pushes the piston head to a prearranged position. At this time the air supply is diverted from that side, the slide valve is temporarily in a neutral position, the spark is applied all in sequence, and the resulting explosure pressure is utilized to operate the engine through the sleeve valves. Meanwhile the pump recharges the air chamber to supply the exhausted side with a fresh charge.

The relative capacity of the pump to supply the necessary pressure during the full pressure period of the combustion chamber, the precise moment for diverting the air supply, the timing of the spark with the momentary neutral position of the slide valve, the relative movement of the pistons, and the capacity of the combustion chamber, the interposition of a reducing valve in the slide valve chamber to equalize the cylinder pressure, the placing of a recessed pressure valve to operate a by-pass on the air chamber connected to the exhaust when the air chamber has acquired the desired pressure from the full pressure period, thus enabling the pump to move freely during the low pressure period, are the essential features and factors which contribute to the semi-continuous production of power which this invention contemplates.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a side elevational view of an engine constructed in accordance with this invention.

Fig. 2 is a transverse vertical sectional view taken on the line 2—2 of Fig. 1.

Fig. 3 is a transverse vertical sectional view of the engine shown in Fig. 1, this view being taken on the line 3—3 of Fig. 4.

Fig. 7 is a fragmentary enlarged detailed sectional view of a portion of Fig. 4.

Fig. 8 is a perspective view of the outside tubular member shown in Fig. 7.

Fig. 9 is a perspective view of the inside tubular member shown in Fig. 7.

Fig. 12 is a fragmentary longitudinal sectional view of an engine constructed in accordance with a modified form of the invention.

Figure 4:
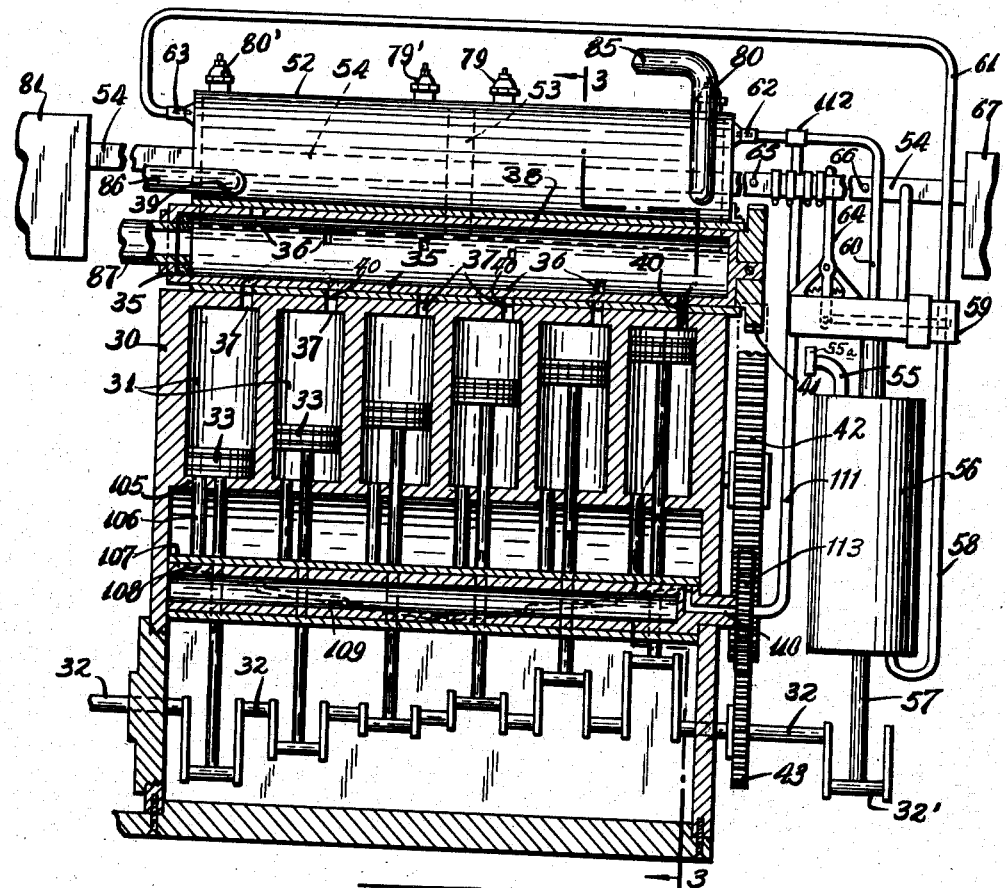
Fig. 4 is a fragmentary longitudinal vertical sectional view taken on the line 4—4 of Fig. 3.

The engine, in accordance with this invention, includes a housing 30 having a plurality of cylinders 31. A rotative crank shaft 32 is mounted within the housing 30 and has its end portions projecting from the housing. Each crank of the crank shaft 32 is connected with a piston 33. These pistons are reciprocal in the cylinders 31. Up to this point the engine is conventional and it is believed that the construction will be readily recognized without further description.

A supply container 35 for gases under pressure is rotatively mounted along the top of the housing 30 and is provided with a plurality of inlet ports 36 spaced so as to periodically connect with passages 37 in the housing 30, which in turn connect with the cylinders 31. A valve device 38 controls the inlet ports 36. This valve device 38 includes a cylindrical sleeve 39 which is fixedly mounted upon the exterior of the container 35. The container 35 is of cylindrical form to receive the sleeve 39. The sleeve 39 is formed with a plurality of passages 40 aligned with the passages 37, and when the inlet ports 36 are aligned with the passages 40 the high pressure gases from the container 35 may enter the tops of the cylinders 31 when the pistons 33 are in a proper position adjacent the top wall of the cylinders 31 to move downwards on their power stroke. The positioning of the ports 36 will be controlled by the staggered positioning of the pistons 33 within the cylinders 31.

The valve device 38 is so arranged that the inlet ports 36 connect the passages 40 of the various cylinders during the rotation of the container 35 to permit the high pressure gases to enter the cylinders at the instant that the pistons thereof are at the top ends, and for a period of time during which the pistons move inwards. For example, one half or more of the stroke of the pistons would be satisfactory. During the remaining period the gases will expand. The container 35 is provided with a gear 41 at one end which meshes with an idler gear 42 mounted on the housing 30 and which in turn meshes with a driver gear 43 mounted on one of the projecting ends of the crank shaft 32. These gears are arranged so that the container 35 makes one revolution for each revolution of the gear shaft 32.

An exhaust container 44 for exhaust gases from the cylinders 31 is mounted on the top of the housing 30 and extends along the path of the cylinders 31. The exhaust container 44 is provided with an outlet 45 through which the exhaust gases may escape. The exhaust container 44 is rotatively mounted and provided with a plurality of exhaust ports 46 spaced so as to periodically connect with passages 47 which in turn connect with the tops of the cylinders 31.¹ A valve device 48 controls these exhaust ports 46. This valve device includes a sleeve 49 fixedly mounted with relation to the container 44 which is of cylindrical form to permit rotation of the container 44. This sleeve 49 is provided with a plurality of passages or openings 50 aligned with the passages 47, and when the exhaust ports 46 are aligned with the passages 47 the gases will exhaust from the various cylinders. The container 44 is provided at one end with a gear 51 which meshes with said idler gear 42. The arrangement is such that the container 44 will make one revolution for each revolution of the crank shaft 32. The ports 46 are so arranged that they will align with the openings 50 during the exhaust period of the pistons 33 or when the pistons are substantially at the bottom of their strokes and moving upwards for forcing the burned gases out of the cylinders 31 to exhaust through the container 44.

A high pressure cylinder 52 is provided for combustible gases. For convenience this cylinder is extended along the length of the housing 30 parallel to the containers 35 and 44. A piston 53 (see Fig. 4) is fixedly mounted on a piston rod 54. The piston 53 is slidable in the cylinder 52 and is free to float in either direction. The piston rod 54 has its ends projecting from the ends of the cylinder 52. The ends of the cylinder 52 are closed and arranged to hold high pressures so that the gases within the cylinder 52 will not leak out during the operation of the engine.

A combustible fuel supply is connected with the ends of the high pressure cylinder 52. This combustible fuel supply may be traced from a supply pipe 55 which may connect with a conventional carbureter or other source of mixed fuel and air or other fuel supply 55ª. The supply pipe 55 connects with a fuel pump 56. This pump has an operator stem 57 connected with a crank portion 32' on the end of the crank shaft 32. This crank portion is capable of operating the pump 56. A pipe line 58 connects with the discharge of the pump 56 and with a distributor valve 59. This valve 59 controls passage of the fuel through a pipe 60 connected with one end of the cylinder 52, and also controls passage through a pipe 61 connected with the other end of the cylinder 52. The terminal end of the pipe 60 has a one way valve 62 which permits passage of fuel into the cylinder 52 but prevents passage in the opposite direction. Similarly, the terminal end of the pipe 61 is provided with a one way valve 63 which controls passage of the fuel into the other end of the cylinder 52 and which prevents backward passage of the fuel or gases from the cylinder.

Means is provided for automatically controlling the distributor valve 59 to alternately connect the pipes 60 and 61 with the fuel discharge pipe 58 in accordance with the position of the floating piston 53 and thus with the piston rod 54. This means is characterized by a control lever 64 from the distributor 59 and several pins 65 and 66 mounted at spaced points on the piston rod 54 on opposite sides of the lever 64. The arrangement is such that when the piston 53 is at the right hand end of the cylinder 52 the pin 65 will strike the lever 64 moving the distributor so that the fuel will now pass through the pipe 60 to enter the right hand end of the cylinder 52. When the pitson 53 is at the extreme left end of the cylinder 52 the pin 66 will strike the lever 64 operating the distributor 59 to cause the fuel to now pass through the pipe 61 into the left hand end of the cylinder 52.

An ignition device is provided for igniting said fuel which is in the end portions of the cylinder 52 controlled in a certain way depending on the floating piston 53. This ignition device is directly controlled by the piston rod 54. This ignition system includes a container 67 fixedly supported in any convenient way. One end of the piston rod 54 extends into the container 67. This inner end is provided with a pair of spaced rack sections 68 and 69. The rack section 68 meshes with a small gear 69' coaxially fixed on a ratchet wheel 70 which is loose on a shaft 71. The ratchet wheel 70 is engaged by a pawl 72 mounted on a gear wheel 73 fixed on the shaft 71. This gear 73 meshes with a rack 74 slidably supported on a track 75 mounted in the container 67. The rack 74 is provided with a projection 76 cooperative with switches 77 and 78 adapted to control circuits, not illustrated on the drawings, which control the spark plugs 79 and 80 mounted on the cylinder 52 along the length thereof.

Figure 10:
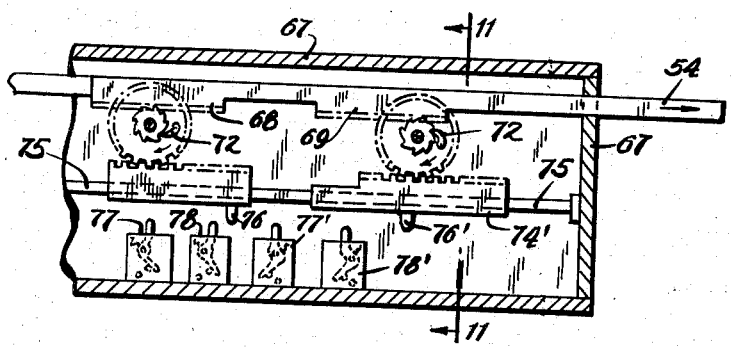
Fig. 10 is a fragmentary longitudinal sectional view of the upper right hand portion of the engine.
Figure 11:
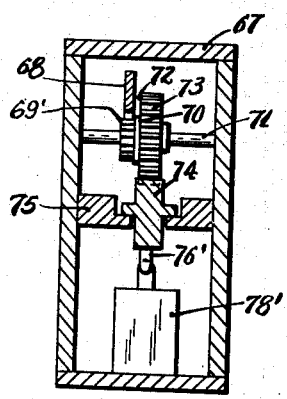
Fig. 11 is a vertical sectional view taken on the line 11—11 of Fig. 10.

The rack sections 69 connects with similar parts as the rack section 68. These parts have been given the same reference numerals and they control the rack 74' which is also slidably mounted on the track system 75. This rack 74' has a projection 76' which controls switches 77' and 78' which in turn are adapted to be connected in an ignition circuit (not shown) to control the spark plugs 79' and 80'. The pawls 72 are arranged in different directions as clearly shown in Fig. 10. The arrangement is such that when the piston rod 54 moves in one direction one of the racks will be moved causing its projection to operate one set of the switches. When the rack 54 moves in the other direction the other switches will be caused to operate.

While four spark plugs 79, 80 and 79' and 80' have been illustrated it should be borne in mind that any number may be used. However, it is advisable that a sufficient number of spark plugs be used to insure complete combustion of the fuel within the container 52. It should be clearly understood that the arrangement is such that the spark plugs will be individually operated during the movement of the piston rod 54. It should be clearly understood that a customary high tension circuit may be provided, the details of which will not be given in this specification since it forms no part of the invention and its construction will be known to those skilled in the art.

A control device is also provided for controlling passage of high pressure fuel from the ends of the high pressure cylinder 52 to said supply container 35. This control device includes a container 81 stationarily mounted and through one end of which, one end of the piston rod 54 extends. Preferably, the containers 67 and 81 are located on opposite ends of the cylinder 52. The container 81 is provided with a pair of spaced inlet ports 82 and 83. A supply valve 84 controls these ports. The length of the slide valve 84 is such that during the course of each stroke of its reciprocation a neutral position will be reached between the ports 82 and 83.

The port 83 is connected by a pipe 85 with one end of the high pressure cylinder 52, and the port 82 is connected by a pipe 86 with the other end of the high pressure cylinder 52. The container 81 is provided with an exhaust pipe 87 which connects with one end of the container 35. The slide valve 84 is controlled by a pair of racks 88 and 89 which are mounted on the slide valve 84. The rack 88 meshes with a gear 90 fixedly mounted on a shaft 91 which is rotatively supported in the container 81. This shaft 91 supports a loose gear 92 which is provided with a pawl 93 engaging a ratchet wheel 94 fixedly mounted on the shaft 91. A rack 54" is mounted on the piston rod 54 and during the reciprocation of the piston rod is adapted to engage the gear 92 and turn the gear shaft in one direction and then in the other direction. However, because of the pawl and ratchet construction the shaft 91 will be periodically turned in one direction only. This motion will be transmitted by the gear 90 to move the rack 88 and thus the valve 84.

The rack 89 meshes with a gear 100 fixedly mounted on a shaft 101 which is rotatively mounted in the container 81. This shaft 101 is provided with a loose gear 102. This gear carries a pawl 103 which meshes with a ratchet 104 fixedly mounted on the shaft 101. However, the pawl and ratchet 103, 104 is of opposite hand to the pawl and ratchet 93, 94. The arrangement is such that the rack 54' will also periodically engage the gear 102 and indirectly move the slide valve 84 in a direction opposite to the direction that it is moved by the operation of the gear 92.

Figure 5:
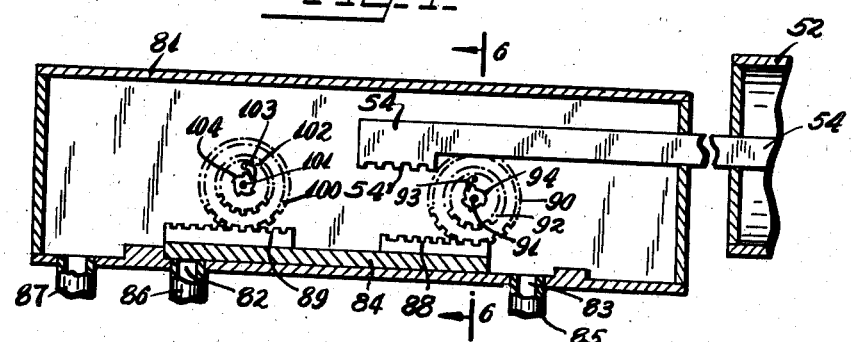
Fig. 5 is a fragmentary longitudinal sectional view of the extreme top left hand portion of the device.
Figure 6:
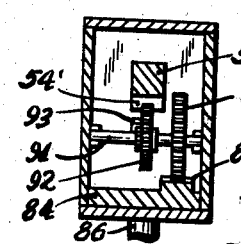
Fig. 6 is a vertical sectional view taken on the line 6—6 of Fig. 5.

In one position of the slide valve 84 the port 82 is closed. Fig. 5 illustrates the parts in this position. The arrangement is such that the slide valve 84 during its operation will be moved to the right and then the port 83 will be closed and the port 82 will be opened.

The bottom end of each cylinder 31 is closed by a wall 105. The bottom of each cylinder 31 is connected by a pipe 106 with a stationary tube 107 mounted in the housing 30. A valve 108 is rotatively mounted within this tube. This valve 108 has a peripheral groove 109 of step formation (see Figs. 4, 7 and 9), which connects with a coaxial passage 110 at one end of the valve 108. This passage 110 connects with a pipe 111 which extends upwards and connects at the point 112 with the pipe 60. The valve 108 is provided with a gear 113 which meshes with the gear 42. The parts are so arranged that the valve 108 rotates at the same speed as the crank shaft 32. The arrangement is such that during downward motion of each piston 33 the bottom of the cylinder 31 is connected with the pipe 60 so that air is pumped from the cylinder into the pipe 60 mixing with the fuel to enhance the combustibility of the gases in the container 52.

The operation of the engine is as follows:

The engine is primed by moving the piston rod 54 so that the piston 53 is at one end of the cylinder 52. The crank shaft 32 is then turned over to operate the pump 56 which will then pump fuel from the supply 55 to the end of the cylinder 52 in which the piston 53 is located. After the pressure builds up in the cylinder 52 the piston 53 starts moving. This moves the piston rod 54. A position will soon be reached in which one of the switches illustrated in Fig. 10 will be operated. This operates one of the spark plugs. If we assume that the piston 53 is at the right hand end of the cylinder 52 the piston 53 and rod 54 will be moving towards the left and the spark plug 80 will function. An explosion or burning of the fuel occurs. This increases the pressure at this end of the cylinder 52 causing the piston 53 to move at an accelerated pace towards the left. Soon a point will be reached when the ignition control shown in Fig. 10 operates another one of the switches setting off the spark plug 79. This re-ignites the fuel in the cylinder 52 driving the piston 53 all the way to the left end of the cylinder 52. At this point the pin 66 strikes the lever 64 reversing the distributor valve 59. When the distributor valve 59 is reversed it closes the passage through the pipe 60 and opens the passage through the pipe 61.

The pump 56 now pumps fuel through the pipe 61 to the left hand end of the cylinder 52. The piston rod 54 starts moving towards the right and soon a point is reached when the ignition device shown in Fig. 10 functions to set off the spark plug 80'. When the piston 53 passes the spark plug 79' the ignition device shown in Fig. 10 again functions to set off this spark plug to re-ignite the fuel and so drive the piston 53 completely towards the right. The engine is now running.

When the piston 53 moves from the left to the right the high pressure cylinder gases in the hight hand portion of the fuel cylinder 52 will pass through the pipe 85 and enter the container 81 and then enter the pipe 87 reaching the container 35 and enter certain of the cylinders 31 which have their pistons 33 in a raised position to force the pistons thereof downwards. When the piston 53 moves to the left the piston rod 54 operates the valve 84 to close the port 83 and open the port 82. Now the burned fuel under pressure in the left end of the cylinder 52 will pass through the pipe 86 and up through the port 82 into the container 81 and out of the pipe 87 into the container 35 so as to always maintain a good pressure within the container 35 which will operate the pistons 33. It should be realized that the exhaust control 48 is also functioning, that is, the sleeve 49 is rotating so as to control the exhaust from the various cylinders 31 to the exhaust pipe 45.

In Fig. 12 a modified form of the invention has been disclosed which distinguishes from the prior form merely in the fact that the engine has been constructed without the air supply from the inner ends of the cylinders connecting with the fuel intake to the power container 52. In other respects this form of the invention is identical to the previous form and like parts are indicated by like reference numerals.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. An engine, comprising a housing having cylinders, a rotative crank shaft within said housing, pistons connected with said crank shaft and working in said cylinders, a supply container for gases under pressure and having inlet ports connecting with the tops of said cylinders, a valve device controlling said inlet ports, an exhaust container for exhaust gases and having exhaust ports connecting with the tops of said cylinders, a valve device controlling said exhaust ports, a high pressure cylinder for combustible gases, a piston floating in said high pressure cylinder, a piston rod connected with said piston in said high pressure cylinder and extending from the ends of said high pressure cylinder, a combustible fuel supply connected with the ends of said high pressure cylinder, means for leading fuel from said supply into one end or the other end of said high pressure cylinder, an ignition system for igniting said fuel in said ends of said high pressure cylinder and controlled from one end of said piston rod, and a control device for connecting high pressure gases from the ends of said high pressure cylinder with said supply container.

2. An engine, comprising a housing having cylinders, a rotative crank shaft within said housing, pistons connected with said crank shaft and working in said cylinders, a supply container for gases under pressure and having inlet ports connecting with the tops of said cylinders, a valve device controlling said inlet ports, an exhaust container for exhaust gases and having exhaust ports connecting with the tops of said cylinders, a valve device controlling said exhaust ports, a high pressure cylinder for combustible gases, a piston floating in said high pressure cylinder, a piston rod connected with said piston in said high pressure cylinder and extending from the ends of said high pressure cylinder, a combustible fuel supply connected with the ends of said high pressure cylinder, means for leading fuel from said supply into one end or the other end of said high pressure cylinder, an ignition system for igniting said fuel in said ends of said high pressure cylinder and controlled from one end of said piston rod, and a control device for connecting high pressure gases from the ends of said high pressure cylinder with said supply container, said container being of cylindrical shape and said valve device including fixedly mounted sleeves on these cylindrical containers.

3. An engine, comprising a housing having cylinders, a rotative crank shaft within said housing, pistons connected with said crank shaft and working in said cylinders, a supply container for gases under pressure and having inlet ports connecting with the tops of said cylinders, a valve device controlling said inlet ports, an exhaust container for exhaust gases and having exhaust ports connecting with the tops of said cylinders, a valve device controlling said exhaust ports, a high pressure cylinder for combustible gases, a piston floating in said high pressure cylinder, a piston rod connected with said piston in said high pressure cylinder and extending from the ends of said high pressure cylinder, a combustible fuel supply connected with the ends of said high pressure cylinder, means for leading fuel from said supply into one end or the other end of said high pressure cylinder, an ignition system for igniting said fuel in said ends of said high pressure cylinder and controlled from one end of said piston rod, and a control device for connecting high pressure gases from the ends of said high pressure cylinder with said supply container, said container being of cylindrical shape and said valve device including fixedly mounted sleeves on these cylindrical containers, the said containers being driven by a transmission system working in synchronization with said rotative crank shaft.

4. An engine, comprising a housing having cylinders, a rotative crank shaft within said housing, pistons connected with said crank shaft and working in said cylinders, a supply container for gases under pressure and having inlet ports connecting with the tops of said cylinders, a valve device controlling said inlet ports, an exhaust container for exhaust gases and having exhaust ports connecting with the tops of said cylinders, a valve device controlling said exhaust ports, a high pressure cylinder for combustible gases, a piston floating in said high pressure cylinder, a piston rod connected with said piston in said high pressure cylinder and extending from the ends of said high pressure cylinder, a combustible fuel supply connected with the ends of said high pressure cylinder, means for leading fuel from said supply into one end or the other end of said high pressure cylinder, an ignition system for igniting said fuel in said ends of said high pressure cylinder and controlled from one end of said piston rod, and a control device for connecting high pressure gases from the ends of said high pressure cylinder with said supply container, said combustible fuel supply including a supply and a pump for pumping said supply under pressure to the ends of said cylinder.

5. An engine, comprising a housing having cylinders, a rotative crank shaft within said housing, pistons connected with said crank shaft and working in said cylinders, a supply container for gases under pressure and having inlet ports connecting with the tops of said cylinders, a valve device controlling said inlet ports, an exhaust container for exhaust gases and having exhaust ports connecting with the tops of said cylinders, a valve device controlling said exhaust ports, a high pressure cylinder for combustible gases, a piston floating in said high pressure cylinder, a piston rod connected with said piston in said high pressure cylinder and extending from the ends of said high pressure cylinder, a combustible fuel supply connected with the ends of said high pressure cylinder, means for leading fuel from said supply into one end or the other end of said high pressure cylinder, an ignition system for igniting said fuel in said ends of said high pressure cylinder and controlled from one end of said piston rod, and a control device for connecting high pressure gases from the ends of said high pressure cylinder with said supply container, said means for leading said fuel from said supply to the ends of the said cylinder including a distributor valve and means for controlling this valve.

6. An engine, comprising a housing having cylinders, a rotative crank shaft within said housing, pistons connected with said crank shaft and working in said cylinders, a supply container for gases under pressure and having inlet ports connecting with the tops of said cylinders, a valve device controlling said inlet ports, an exhaust container for exhaust gases and having exhaust ports connecting with the tops of said cylinders, a valve device controlling said exhaust ports, a high pressure cylinder for combustible gases, a piston floating in said high pressure cylinder, a piston rod connected with said piston in said high pressure cylinder and extending from the ends of said high pressure cylinder, a combustible fuel supply connected with the ends of said high pressure cylinder, means for leading fuel from said supply into one end or the other end of said high pressure cylinder, an ignition system for igniting said fuel in said ends of said high pressure cylinder and controlled from one end of said piston rod, and a control device for connecting high pressure gases from the ends of said high pressure cylinder with said supply container, said means for leading said fuel from said supply to the ends of the said cylinder including a distributor valve and means for controlling this valve, comprising a control lever, and pins mounted at spaced points on said piston rod for moving the control lever in one direction or the other as the piston rod reaches the ends of its stroke.

7. An engine, comprising a housing having cylinders, a rotative crank shaft within said housing, pistons connected with said crank shaft and working in said cylinders, a supply container for gases under pressure and having inlet ports connecting with the tops of said cylinders, a valve device controlling said inlet ports, an exhaust container for exhaust gases and having exhaust ports connecting with the tops of said cylinders, a valve device controlling said exhaust ports, a high pressure cylinder for combustible gases, a piston floating in said high pressure cylinder, a piston rod connected with said piston in said high pressure cylinder and extending from the ends of said high pressure cylinder, a combustible fuel supply connected with the ends of said high pressure cylinder, means for leading fuel from said supply into one end or the other end of said high pressure cylinder, an ignition system for igniting said fuel in said ends of said high pressure cylinder and controlled from one end of said piston rod, and a control device for connecting high pressure gases from the ends of said high pressure cylinder with said supply container, said ignition system including spark plugs mounted along the length of said high pressure cylinder and means for firing said spark plugs substantially as described.

8. An engine, comprising a housing having cylinders, a rotative crank shaft within said housing, pistons connected with said crank shaft and working in said cylinders, a supply container for gases under pressure and having inlet ports connecting with the tops of said cylinders, a valve device controlling said inlet ports, an exhaust container for exhaust gases and having exhaust ports connecting with the tops of said cylinders, a valve device controlling said exhaust ports, a high pressure cylinder for combustible gases, a piston floating in said high pressure cylinder, a piston rod connected with said piston in said high pressure cylinder and extending from the ends of said high pressure cylinder, a combustible fuel supply connected with the ends of said high pressure cylinder, means for leading fuel from said supply into one end or the other end of said high pressure cylinder, an ignition system for igniting said fuel in said ends of said high pressure cylinder and controlled from one end of said piston rod, and a control device for connecting high pressure gases from the ends of said high pressure cylinder with said supply container, said ignition system including spark plugs mounted along the length of said high pressure cylinder and means for firing said spark plugs substantially as described, said means including a rack movable on the track system.

9. An engine, comprising a housing having cylinders, a rotative crank shaft within said housing, pistons connected with said crank shaft and working in said cylinders, a supply container for gases under pressure and having inlet ports connecting with the tops of said cylinders, a valve device controlling said inlet ports, an exhaust container for exhaust gases and having exhaust ports connecting with the tops of said cylinders, a valve device controlling said exhaust ports, a high pressure cylinder for combustible gases, a piston floating in said high pressure cylinder, a piston rod connected with said piston in said high pressure cylinder and extending from the ends of said high pressure cylinder, a combustible fuel supply connected with the ends of said high pressure cylinder, means for leading fuel from said supply into one end or the other end of said high pressure cylinder, an ignition system for igniting said fuel in said ends of said high pressure cylinder and controlled from one end of said piston rod, and a control device for connecting high pressure gases from the ends of said high pressure cylinder with said supply container, said ignition system including spark plugs mounted along the length of said high pressure cylinder and means for firing said spark plugs substantially as described, said means including a rack movable on the track system, said rack being provided with projections cooperable with switches.

10. An engine, comprising a housing having cylinders, a rotative crank shaft within said housing, pistons connected with said crank shaft and working in said cylinders, a supply container for gases under pressure and having inlet ports connecting with the tops of said cylinders, a valve device controlling said inlet ports, an exhaust container for exhaust gases and having exhaust ports connecting with the tops of said cylinders, a valve device controlling said exhaust ports, a high pressure cylinder for combustible gases, a piston floating in said high pressure cylinder, a piston rod connected with said piston in said high pressure cylinder and extending from the ends of said high pressure cylinder, a combustible fuel supply connected with the ends of said high pressure cylinder, means for leading fuel from said supply into one end or the other end of said high pressure cylinder, an ignition system for igniting said fuel in said ends of said high pressure cylinder and controlled from one end of said piston rod, and a control device for connecting high pressure gases from the ends of said high pressure cylinder with said supply container, comprising a container having a pair of spaced ports, a supply valve for controlling said ports of the container of said control device, a slide valve selectively engageable over the ports of the container of said control device; a mechanism operated by the piston rod of said high pressure cylinder for controlling the slide valve, and a piping system from the ports of the container of said control device to the ends of the said high pressure cylinder, and a pipe from the container of said control device to said supply container.

11. An engine, comprising a housing having cylinders, a rotative crank shaft within said housing, pistons connected with said crank shaft and working in said cylinders, a supply container for gases under pressure and having inlet ports connecting with the tops of said cylinders, a valve device controlling said inlet ports, an exhaust container for exhaust gases and having exhaust ports connecting with the tops of said cylinders, a valve device controlling said exhaust ports, a high pressure cylinder for combustible gases, a piston floating in said high pressure cylinder, a piston rod connected with said piston in said high pressure cylinder and extending from the ends of said high pressure cylinder, a combustible fuel supply connected with the ends of said high pressure cylinder, means for leading fuel from said supply into one end or the other end of said high pressure cylinder, an ignition system for igniting said fuel in said ends of said high pressure cylinder and controlled from one end of said piston rod, and a control device for connecting high pressure gases from the ends of said high pressure cylinder with said supply container, comprising a container having a pair of spaced ports, a supply valve for controlling said ports of the container of said control device, a slide valve selectively engageable over the ports of the container of said control device; a mechanism operated by the piston rod of said high pressure cylinder for controlling the slide valve, and a piping system from the ports of the container of said control device to the ends of the said high pressure cylinder, and a pipe from the container of said control device to said supply container, the means for operating said slide valve including a rack system cooperative with a pawl and ratchet system.

12. An engine, comprising a housing having cylinders, a rotative crank shaft within said housing, pistons connected with said crank shaft and working in said cylinders, a supply container for gases under pressure and having inlet ports connecting with the tops of said cylinders, a valve device controlling said inlet ports, an exhaust container for exhaust gases and having exhaust ports connecting with the tops of said cylinders, a valve device controlling said exhaust ports, a high pressure cylinder for combustible gases, a piston floating in said high pressure cylinder, a piston rod connected with said piston in said high pressure cylinder and extending from the ends of said high pressure cylinder, a combustible fuel supply connected with the ends of said high pressure cylinder, means for leading fuel from said supply into one end or the other end of said high pressure cylinder, an ignition system for igniting said fuel in said ends of said high pressure cylinder and controlled from one end of said piston rod, a control device for connecting high pressure gases from the ends of said high pressure cylinder with said supply container, and means associated with the bottom ends of said cylinders for supplying air to said high pressure cylinder to assist combustion.

PATRICK JAMES KENNON.